Jan. 30, 1934.  J. W. SMALL ET AL  1,945,089
AUTOMOBILE TRAILER
Filed June 1, 1931  8 Sheets-Sheet 2
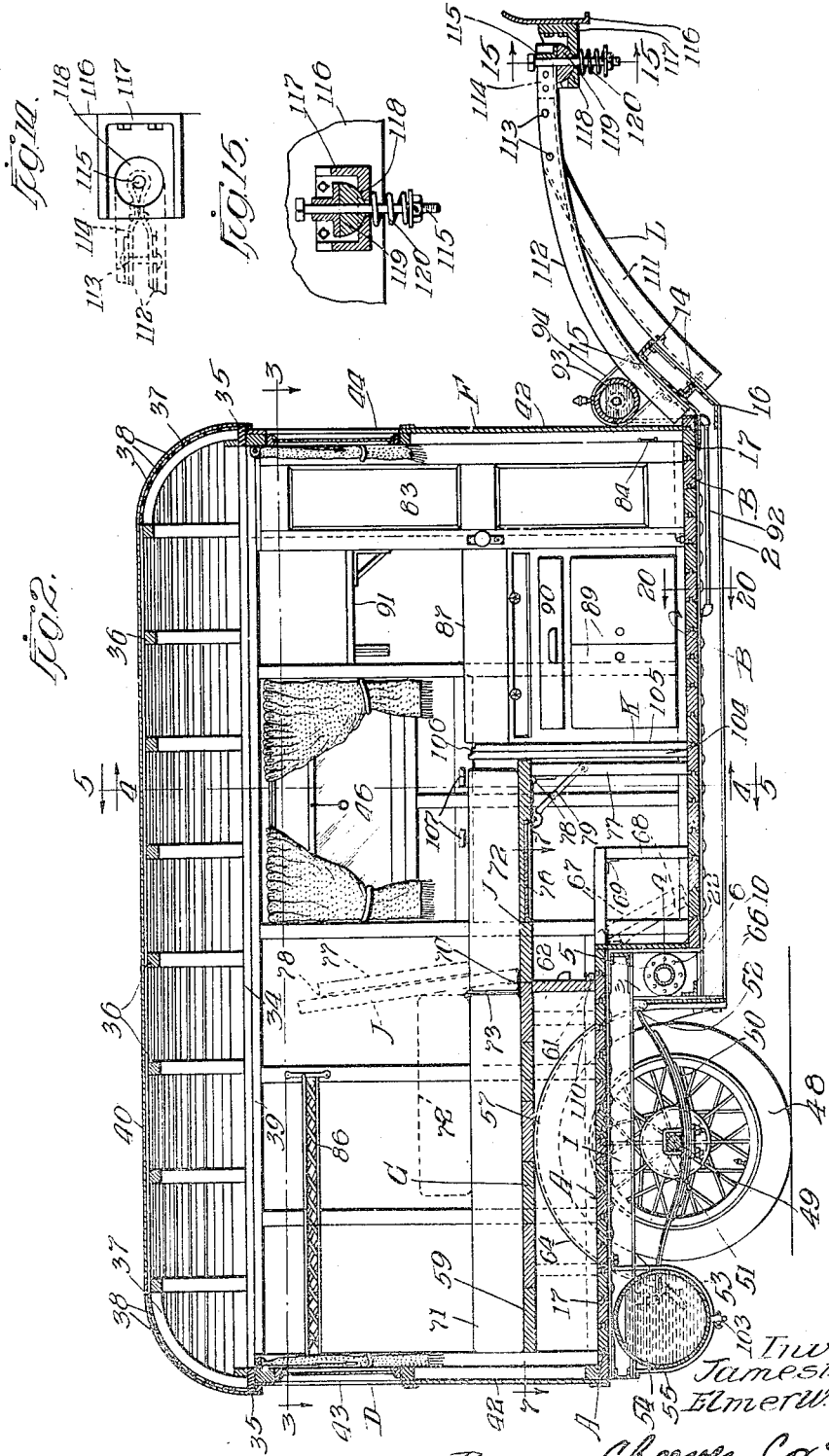

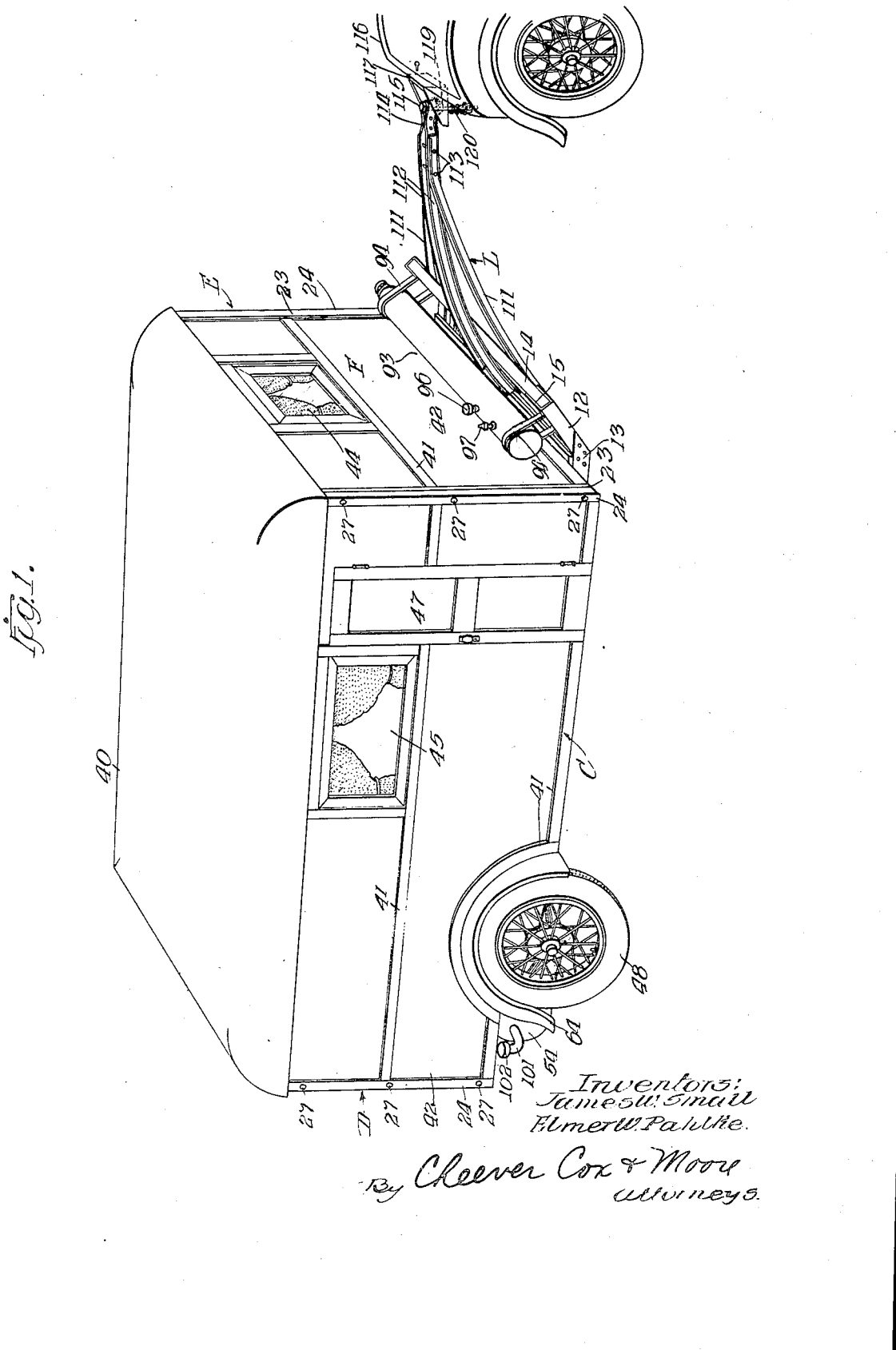

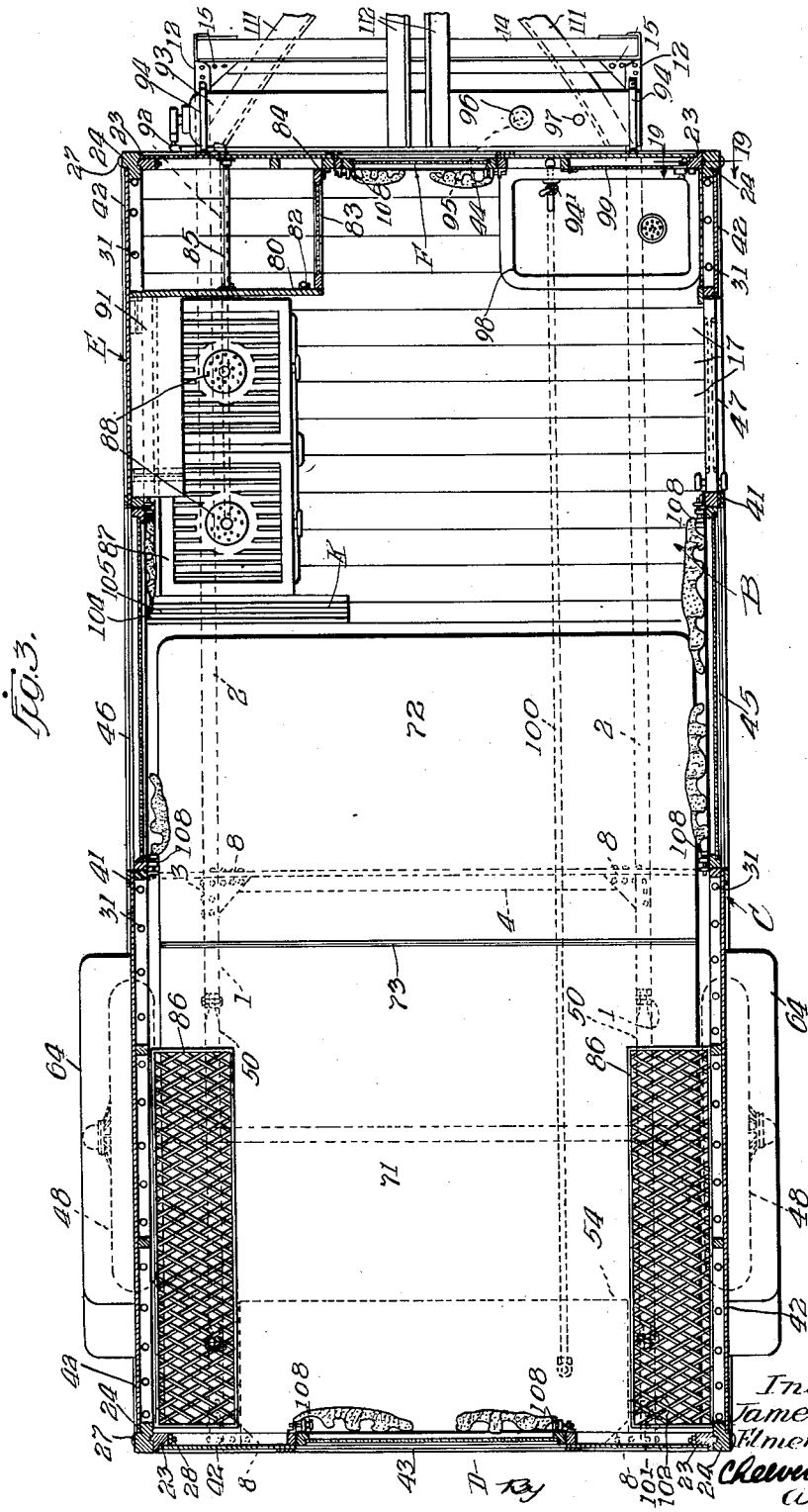

Jan. 30, 1934.   J. W. SMALL ET AL   1,945,089
AUTOMOBILE TRAILER
Filed June 1, 1931   8 Sheets-Sheet 4
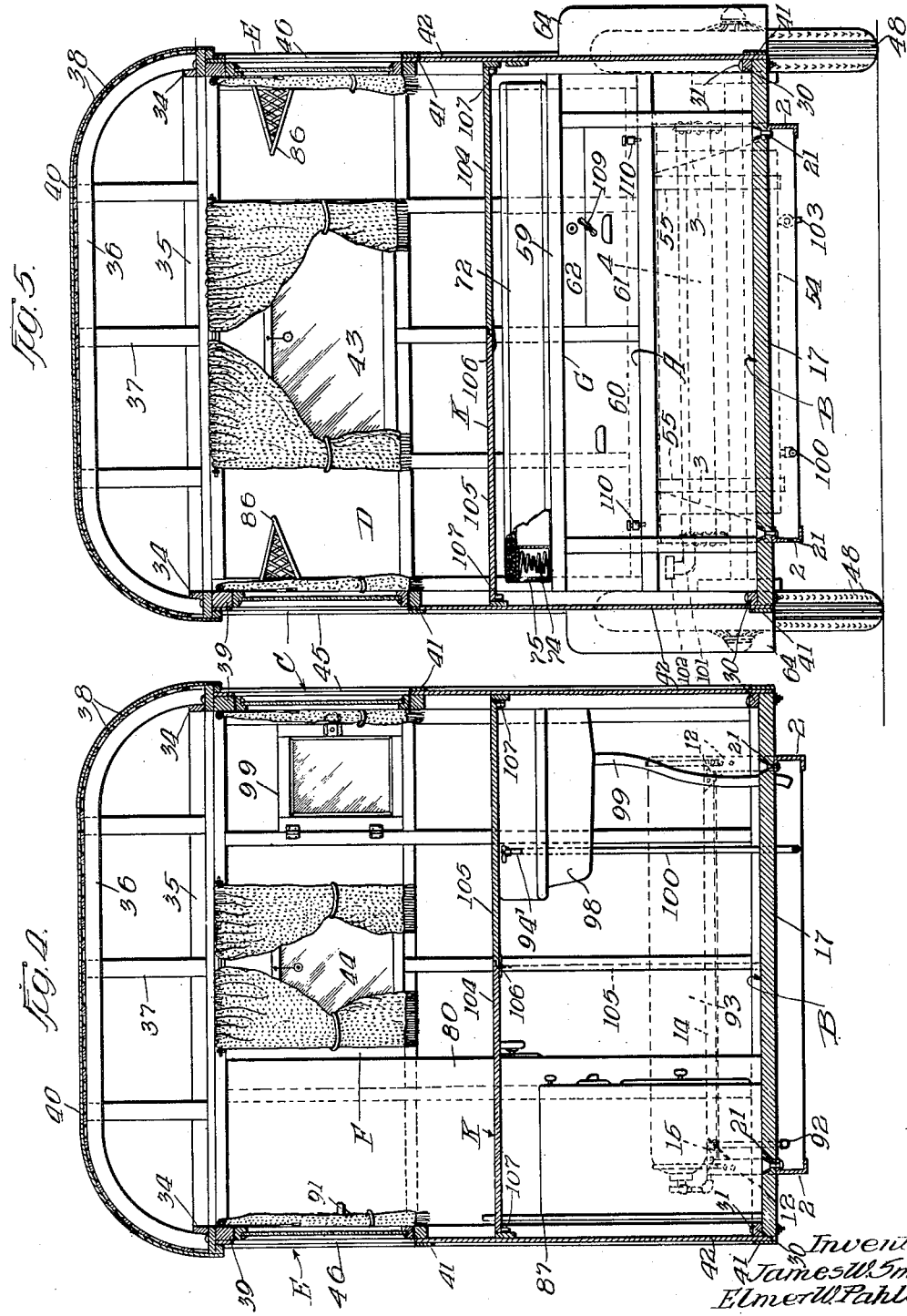

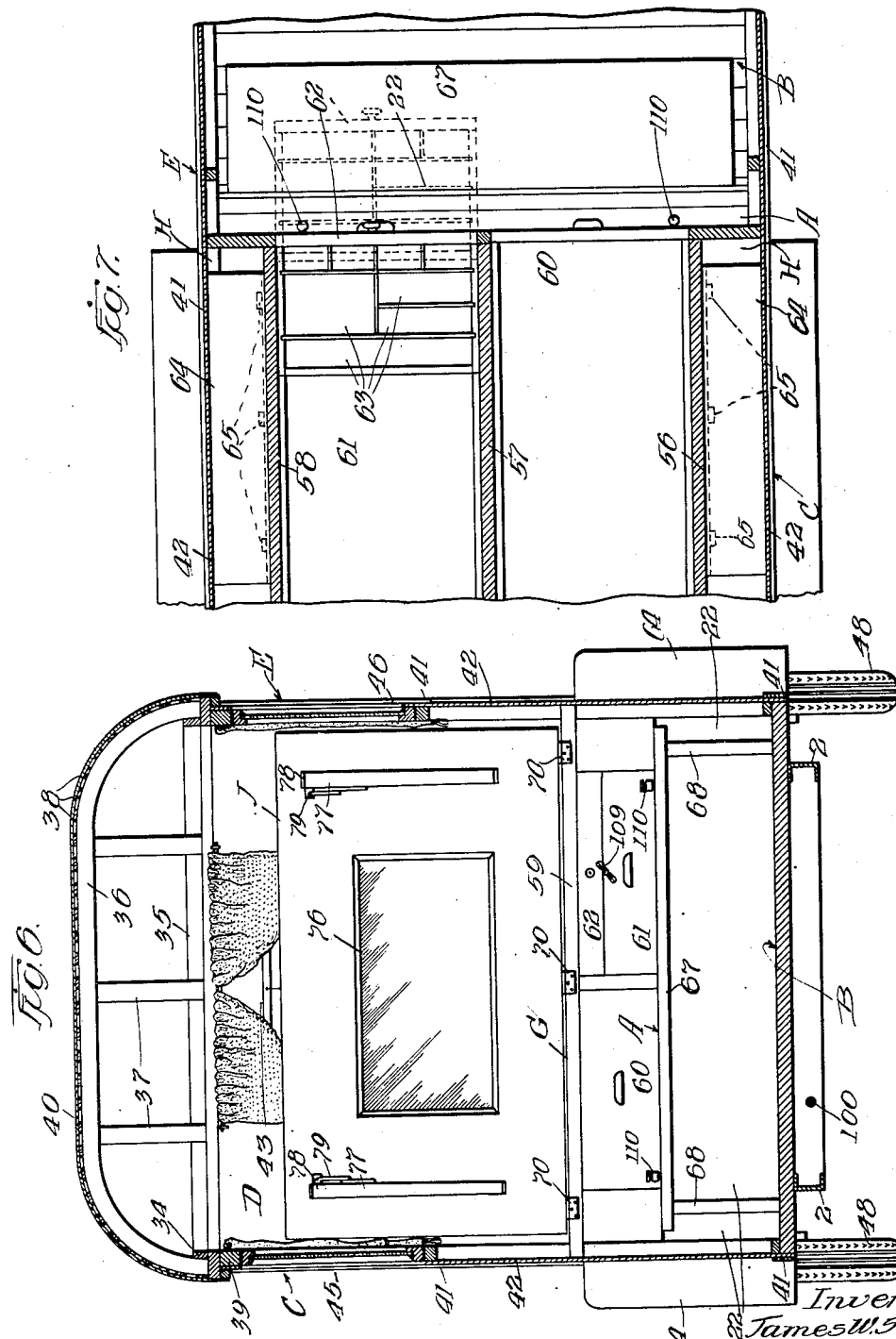

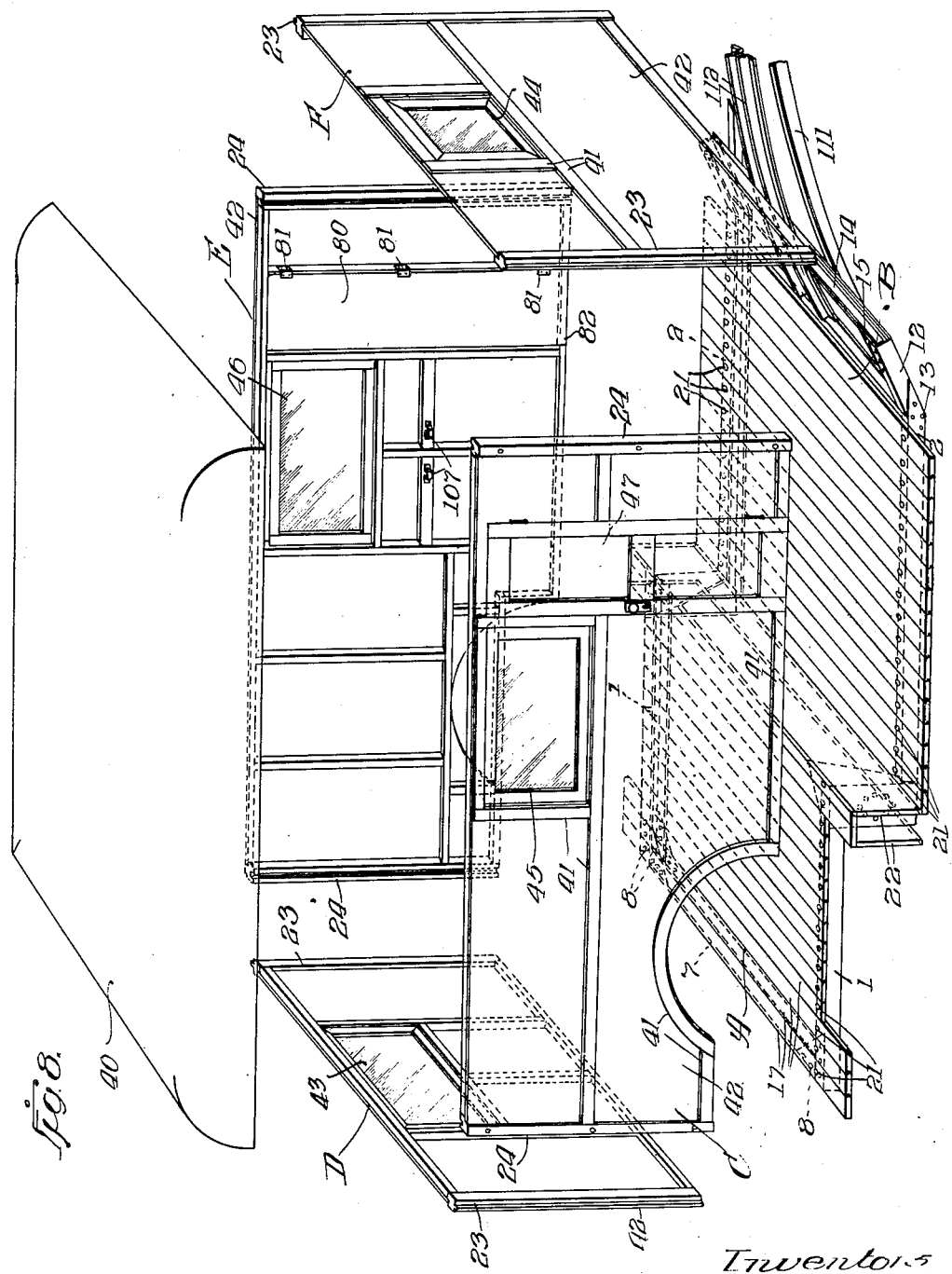

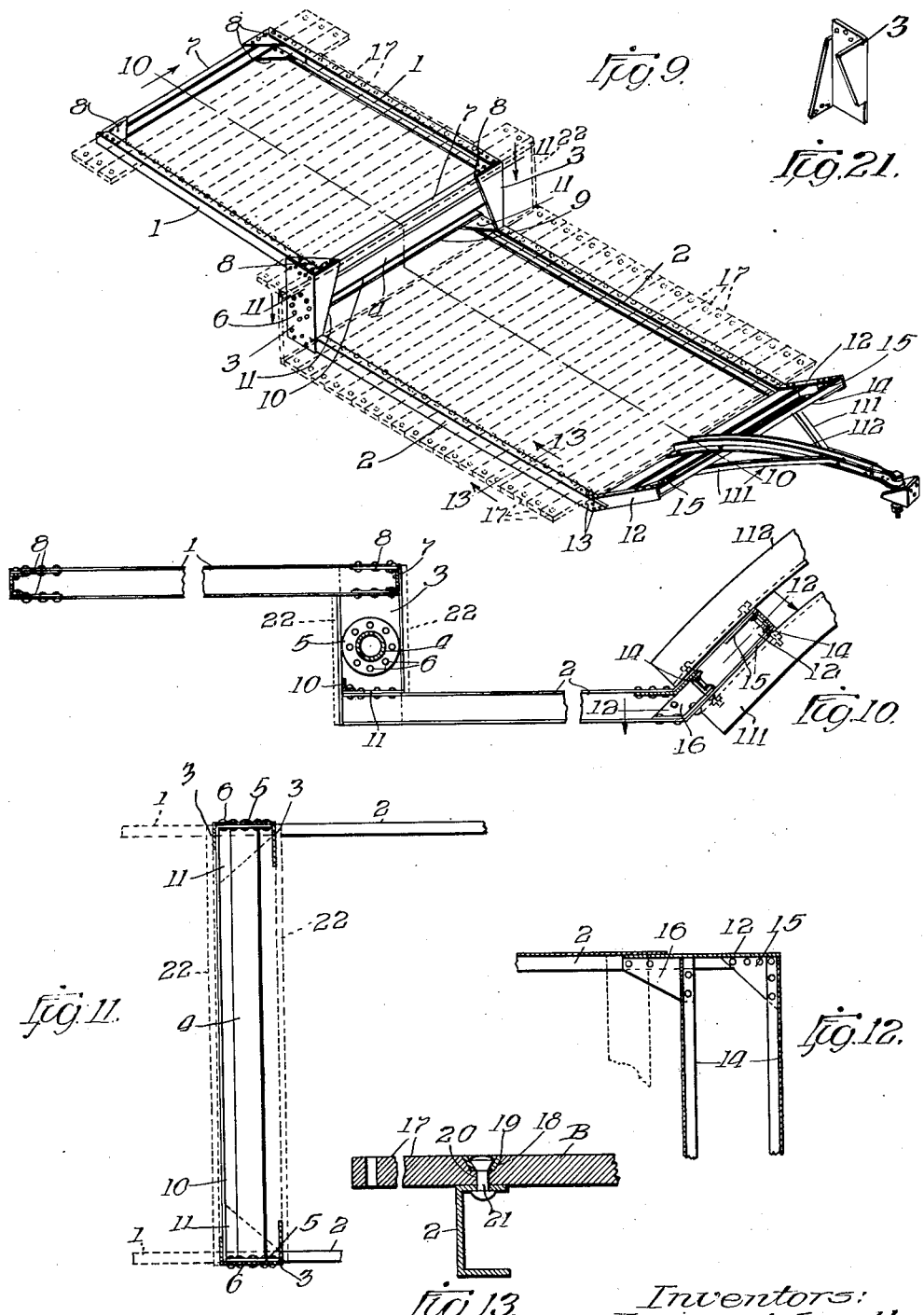

Jan. 30, 1934.   J. W. SMALL ET AL   1,945,089
AUTOMOBILE TRAILER
Filed June 1, 1931    8 Sheets-Sheet 8
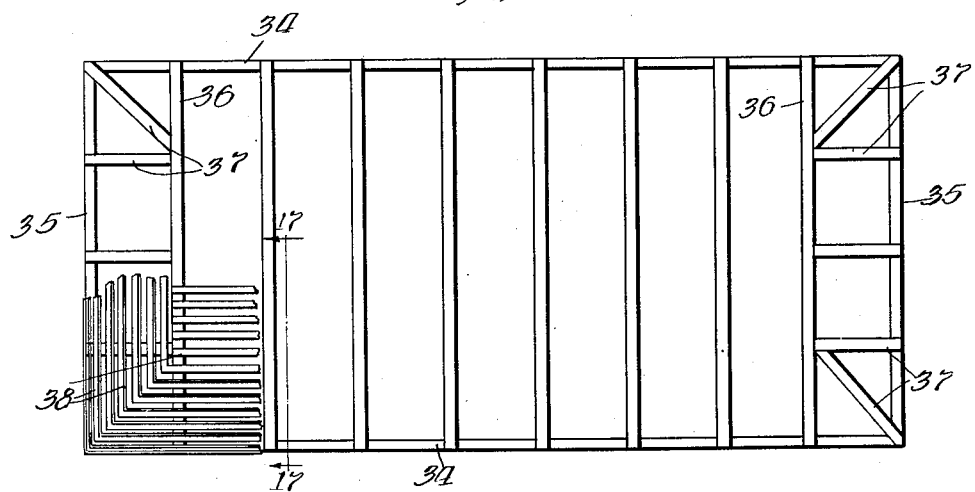
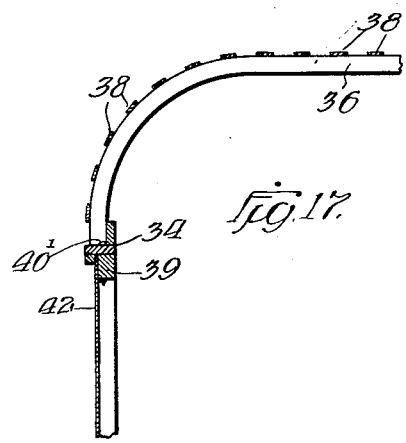
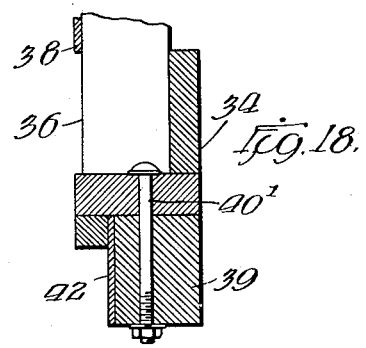
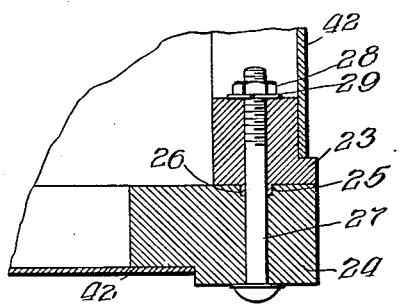
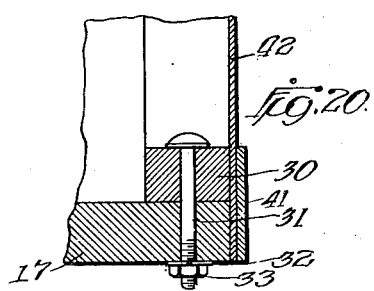
Inventors:
James W. Small
Elmer W. Pahlke
By Cheever Cox + Moore
Attorneys Patented Jan. 30, 1934

1,945,089

UNITED STATES PATENT OFFICE 1,945,089

AUTOMOBILE TRAILER

James W. Small and Elmer W. Pahlke, Chicago, Ill.

Application June 1, 1931. Serial No. 541,226

11 Claims. (Cl. 296—23)

The present invention relates to trailers for automobiles and the like, and relates particularly to trailers of the type used for camping out along the road. In other words, the trailer is designed particularly for tourists' use.

One object of our invention is to provide a trailer which will combine a maximum of efficiency with a minimum amount of space. At least we have attempted to so construct the trailer that the same may be used for all necessary purposes without sacrificing any necessary amount of space needed in the trailer for various desired purposes. In other words, our trailer is so constructed that a fair sized kitchen and eating room is provided when desired, and also a full sized bed is provided for sleeping purposes when desired. Yet the combined floor space necessary for the kitchen or working space and the bed space is less than the sum of the spaces necessary for each of these purposes separately.

Another object of this invention, and indeed a very important object, is the provision of means whereby the working space is relatively close to the ground so as to make it easier to enter the trailer than where a high floor space is used, and we have attempted to utilize the available space within the trailer for a maximum of efficiency.

Still a further object of our invention resides in the provision of a trailer which can be dis-assembled for storing in the ordinary garage so as to make it unnecessary to have additional storage space for the trailer when the same is not in use. The ordinary garage used by the car owner is from two to four feet wider than the car and usually a little longer than the car. Also the height of the garage is sufficient to provide storage space above the car, which storage space we intend to utilize for the purpose of storing parts of the trailer which is made so that the same can be readily dis-assembled into relatively narrow sections which take up very little space.

Other objects of this invention will appear hereinafter as the description thereof proceeds, the novel features, combinations and arrangements being set forth in the appended claims.

In the drawings

Fig. 1 represents a perspective view of our trailer showing the manner in which the same is attached to the rear end of an automobile;

Fig. 2 is a cross-section taken substantially through the longitudinal vertical center of the trailer;

Fig. 3 is a horizontal section taken substantially along the line 3—3 of Fig. 2;

Fig. 4 is a section taken substantially along the line 4—4 of Fig. 2;

Fig. 5 is a section taken substantially along the line 5—5 of Fig. 2;

Fig. 6 is a section similar to that illustrated in Fig. 5 but with the parts in a different position of adjustment;

Fig. 7 is a section taken substantially along the line 7—7 of Fig. 2;

Fig. 8 is a view illustrating the manner in which the various sections of the body of the trailer are detached from each other for the purposes of storing the same;

Fig. 9 is a perspective view of the frame which supports the trailer body;

Fig. 10 is a section on the line 10—10 of Fig. 9;

Fig. 11 is a section taken along the line 11—11 of Fig. 9;

Fig. 12 shows a section taken along the line 12—12 of Fig. 10;

Fig. 13 is a section taken along the line 13—13 of Fig. 9;

Fig. 14 is a plan view of the means for connecting the trailer to a socket fastened to the rear of an automobile;

Fig. 15 is a section taken along the line 15—15 of Fig. 2;

Fig. 16 is a plan view of the top of a trailer showing the construction of the framework therefor;

Fig. 17 is a section taken along the line 17—17 of Fig. 16;

Fig. 18 is an enlarged view of the joint which connects the top and side walls;

Fig. 19 is an enlarged horizontal section showing the manner in which the side walls are joined to each other;

Fig. 20 shows the manner in which the side walls are connected to the floor of the trailer, and Fig. 21 is a detail of the gusset plate.

In carrying out our invention, we desire to make a trailer which may be used for sleeping quarters and also for a rest room or for a kitchen and dining room combined. In other words, the trailer is designed to take care of all of the needs of the tourist, thereby making it unnecessary for him to look for special shelter at roadside touring camps and enables him to stop over at any desired place on the road without making it necessary for him to be near a town where he can secure water or food or shelter.

Our trailer is designed particularly for the purpose of providing a home on wheels which can be attached to the tourists' automobile, thereby enabling them to store all food, luggage, bedding, etc., in the trailer and enabling them to enjoy the full benefits and comforts of the automobile while driving. Furthermore, the trailer is so constructed that it has very little road clearance and thereby increases the safety factor and makes the trailer blend more completely with the low lines of the modern automobile. At the same time the trailer enables the individual to stand upright therein without discomfort.

Essentially the trailer comprises a main frame to which the floor is permanently secured, although the same can be detachably secured to the frame, if desired. The floor supports the two side and the two end walls of the trailer in which are provided suitable doors and windows. The side and end walls are each integrally formed and consequently may be separated as units and stored away in a conveniently narrow space. The top rests on the side walls and is detachably secured thereto. The accessories arranged within the trailer are also detachably arranged therein so that while forming a permanent part of the structure while the trailer is in use, the same may be conveniently detached when the trailer is to be stored.

The frame for supporting the trailer body is best illustrated in Figs. 9, 10, 11 and 12. The main portion of the frame is made of channel sections. There are two sets of side rails, 1 and 2, joined together by the vertically extending gusset plates 3 which are channel shaped in section, the sides of the channel being triangularly shaped and sloping in opposite directions (see Fig. 21). These are united and welded in position as clearly seen in Fig. 11. Between the plates 3 there extends a tubular torque tube 4 having flanges 5 secured by means of rivets 6 to the plates 3. The channel sections 7 joined to the channel sections 1 by the plates 8 form therewith a rectangular upper supporting frame portion which acts as a support for storage drawers and the bed which is arranged over the wheels and the space between the wheels in a manner to be described later. It will be noted that the ends of the channel section 7 are arranged between the opposite flanges of the channel sections 1, and that the plates 8 are arranged between the adjacent flanges of connecting ones of the channel sections 1 and 7, as is clearly illustrated in Fig. 10. The cross channel sections ordinarily need not be quite as heavy as the longitudinal channel sections.

The angle bar 10 extends from one channel iron 2 to the other and is connected to each of the channel irons by the plates 11, as is quite clearly shown in Figs. 9, 10 and 11. Channel sections 12 are connected to the forward ends of the channel sections 2 at an angle substantially as shown in Fig. 10 and for a purpose which will appear later. These channel sections are connected by the bracing cross channel sections 14 connected by means of gusset plates 15 and 16. The channels 2 provide a dropped section which is used for the main floor space of the trailer. This is the space used for the kitchen, and for eating quarters as well as a resting place, when desired. In other words, this is the space used for the combined living room and kitchen. The section on the raised portion of the frame is used for storage space and sleeping quarters as will appear hereinafter.

As indicated by dotted lines in Fig. 9 and by full lines in Fig. 8, the frame is covered by a flooring, the boards of which are indicated generally by the reference numeral 17 and these are secured to the frame in the manner best illustrated in Fig. 13. Each of the boards is provided with a countersunk opening 18 in which a conical lining member 19 is inserted to act as a bearing surface. The countersunk opening 18 communicates with an opening 20 for the reception of a rivet 21 which is hot or cold pressed in place to hold each of the boards firmly against the frame. In order to keep out dust and dirt from the interior of the trailer we also cover the opening between the upper and lower sections of the frame by means of the pieces of fiber board 22 illustrated by dotted lines in Fig. 10 and by full lines in Figs. 8 and 9. We will hereafter refer to the upper floor section as the floor A and the lower floor section as the floor B or dropped section. The four upstanding walls which we shall refer to generally as C, D, E and F are each made in any suitable manner that may be desired, and we preferably make the frame of wood and brace the same in any suitable manner. The outer portions of the walls we cover with a composition board, or if desired, in any other suitable manner, although it has been found that a fiber composition board is one which is readily worked and provides a neat and attractive appearance for the trailer body without involving a great amount of expense. The walls C, D, E and F have corner posts 23 and 24, the former being on the end walls D and F and the latter being on the side walls C and E. The corner posts 23 and 24 have a tongue and groove connection 25 and 26 illustrated best in Fig. 19. A bolt 27 passes through the corner posts 23 and 24 for holding the corner posts in proper aligned relation with each other. A nut 28 on the bolt 27 and lockwasher 29 act as means whereby the corner posts are securely held in operative relation with each other. Similarly, as illustrated in Fig. 20, the bottom guide rail 30 of each of the walls C, D, E and F is secured by means of a bolt 31, lockwasher 32 and nut 33 to the boards 17 which form the flooring of the trailer.

The top is best illustrated in Figs. 16 and 17, and comprises a rectangular framework formed of side and end members 34 and 35 respectively. Bow pieces 36 are connected to opposite side rails 34 and other bow strips 37 are connected between the end members 35 and the adjacent bow strip 36. The bow strips are covered with slats 38 and on top of the slats is a cover 40 of weatherproof canvas, leather, or any other suitable material which can form an imperforate roof.

The side and end members of the main framework for the top are connected to the upper rails 39 of the side and end walls C, D, E and F, as is clearly illustrated in Figs. 17 and 18. Bolts 40' act as securing means for this purpose. The side and end walls of the trailer are covered by a composition board indicated by the reference numeral 42 and as indicated in Fig. 18 there is an auxiliary strip 41 secured to the frame of the top which overlaps the composition board secured to the side and end walls so as to give an attractive appearance to the trailer body and also protect the interior of the body from the elements. The end walls D and F are provided with the windows 43 and 44 respectively, while the side walls C and E are provided with the windows 45 and 46 respectively, also the door 47 is provided in the side wall C.

As best illustrated in Figs. 1, 2 and 5, it will be noted that the wheels 48 supported on a dead axle 49 are adapted to support the trailer at a point below the floor A. Springs 50 are connected by straps 51 to the axle 49 and the spring in turn is connected by shackles 52 and 53 to the channel sections 1. A water tank 54 is carried by the frame beneath the floor A by means of the straps 55 secured to the section of the frame which supports the floor A and these straps are bolted securely to the channel sections 1, by bolts or the like.

Extending upwardly from the floor A are the vertical guide members 56, 57 and 58. These are covered by the flooring 59 seen best in Fig. 2, and the spaces between the guides 56, 57 and 58 are occupied by storage drawers 60 and 61 respectively, an auxiliary drawer 62 having a plurality of small compartments 63 which can be pulled out separately, or as part of the drawer 61, is adapted to be used for toilet articles and the like used by the feminine members of the touring party. We shall refer to this hereafter, as a vanity drawer 62. The storage drawer 60 may be used for the storage of foods, especially canned goods and the like, and 61 may be used for linens, etc. The flooring over the drawers we shall refer to hereafter by the letter G and this extends not only over the drawers but extends also slightly thereabove and into engagement with the side walls C and E of the trailer, thereby covering up the space over the wheels and forming with the vertical guides 58 and 56, wells for the reception of the wheels and for the fenders for the wheels. The fenders 64 are arranged within the walls which we shall hereafter designate as H and are secured in place therein in any suitable manner, such as by attachment to the guides 58 and 56 by machine screws 65 extending through a vertical flange on the edge of the fender. The ends of the fender portion are also secured, as at 66, to the vertically extending section which connects the upper and lower frame sections, as best illustrated in Fig. 2.

Substantially in alignment with the floor A is a seat 67 having the legs 68 pivoted thereto by the hinge 69 so that if desired, the seat may be folded into an inoperative position, as indicated by the dotted lines in Fig. 1. This seat may be provided with a cushion, if desired.

The flooring G has an extension J pivoted thereto by the hinges 70 so that the same may be moved either to the full or dotted line positions shown therefor in Fig. 2. When the extension J is in full line position shown in Fig. 2, the combined length of the flooring G and extension J are sufficient to accommodate a full length mattress which may, if desired, be rolled up out of the way to permit the extension to be moved to its dotted line position shown in Fig. 2. However, we prefer to provide a two-part mattress, the sections of which are indicated by the reference numerals 71 and 72, and which are hinged together by a fabric or leather hinge 73 so that when it is desired to move the extension J to its inoperative or rather dotted line position shown in Fig. 2, the section 72 may be swung about the hinge 73 to bring the same on top of the section 71 of the mattress. Or, if desired, the hinge 73 may be dispensed with and a two-part mattress be used, one section of which is thrown on top of the other during the time that the bed is not being used. We prefer to use an inner-spring mattress which is illustrated best in Fig. 5. This comprises the coils 74 encased in fabric sleeves 75 and covered with batting in the usual manner. No claim is laid to the particular type of mattress being used, but in actual practice, in view of the fact that no springs are provided on the flooring G, an inner-spring mattress is desirable. In the underside of the extension J is a mirror 76 which can be used when the extension J is in its uppermost position. Legs 77 pivoted to the extension J by hinges 78 are adapted to fold against the extension when the same is in its dotted line position shown in Fig. 2. When the legs are in operative position as shown in Fig. 2, they are braced by the toggle links 79 secured to the extension and to one side of the legs. The toggle links prevent the legs from collapsing when in their operative position. The width of the inside of the trailer is sufficient so that a standard size, full width mattress may be accommodated therein.

With the arrangement which has just been described it is quite evident that part of the available floor space B is also used to accommodate a portion of the mattress whenever the bed is in use and thereby the overall length of the trailer is cut down and yet the amount of floor space desired for various requirements can be had at the times desired. Even with the bed in position, part of the kitchen equipment may be used.

In the forward corner of the trailer, at one side thereof, we provide a closet space formed by the upstanding wall 80, which is pivoted to the wall E by the hinges 81 illustrated best in Fig. 8, in which the same is shown collapsed against the side of the wall for storage purposes. At the bottom of the wall 80 is a fastener 82 adapted to enter an opening in the floor to hold the wall 80 in its operative position, which is best illustrated in Figs. 3 and 4. A door 83 is hinged to the front wall F, as at 84, so that the door can be folded against the wall F when the trailer is to be stored away and it is adapted to co-operate with the wall 80 to form a closet space when the trailer is assembled. A detachable bar 85 extends across the top of the closet for the purpose of supporting coat hangers.

Above the mattress there are supported the racks 86 which are adapted to support articles of clothing, or luggage or whatnot without interfering with the proper use of the trailer.

A gasoline operated stove 87 is adapted to be arranged next to the wall 80 as best illustrated in Figs. 2 and 3, and is provided with the usual burners 88. Below the stove is a storage space closed by means of the doors 89 and a drawer 90 is also provided in this storage space for receiving kitchen utensils and the like. This equipment is merely of a suggestive nature and our invention is not limited to the particular type of equipment used for the trailer. If desired, a shelf such as 91 may be provided above the stove.

The gasoline stove is fed by fuel from the pipe 92 which leads from the gasoline storage tank 93 supported in front of the wall F on a portion of the frame and held thereon by means of the straps 94. The tank 93 is provided with a filling opening 95 covered by a suitable cap 96 which is adapted to close the opening 95 and make an air-tight seal for the tank. An air valve 97, such as is commonly used for automobile tires, is secured to the tank so that a pressure may be placed on the gasoline in the tank to force the gasoline upward to the stove. The air pressure may be supplied either by the hand pump, or preferably at filling stations where free air is supplied. The tank may also be provided with a gauge to indicate the pressure therein, if so desired.

In the other corner at the front of the trailer is a sink 98 having a drain 99 and a spigot 94. The drain extends through the floor of the trailer as illustrated clearly in Fig. 4. A mirror 99 is arranged on the wall F above the sink. If desired, a medicine cabinet can be used here. The spigot 94 is connected by a pipe 100 to the water tank 54. The water tank 54 is also provided with a filling spout 101 provided with a cap 102. A suitable pressure valve (not shown) similar to the valve 97 on the tank 93 is provided for the purpose of forming a pressure on the water in the tank 54 to thereby force the water through the pipe 100 to the spigot 94'. If desired, the tank 54 may be provided with a drain valve or emergency valve 103 so that one can drain the tank and remove the sediment, or draw water from the tank in case the pressure drops in the tank due to a leak in the pressure line.

When the extension J is in dotted line position shown in Fig. 2 or the full line position shown in Fig. 6, the table used for eating purposes may be put in position. This table comprises a section made of two leaves 104 and 105 connected by means of a hinge 106 and supported at the ends by brackets 107 upon which the leaves 104 and 105 rest. If desired, only one-half the table may be used so as to increase the amount of working space provided in the trailer. In order to do this, all that it is necessary to do is to move the section 105 downwardly to a vertical position, as illustrated in Fig. 4 and this section will thereby act as a leg to support the end of the leaf 104, which is not then supported by the bracket 107. Preferably, the brackets 107 are U-shaped brackets as clearly illustrated in Fig. 8 and these are adapted to receive pins on the ends of the leaves so as to prevent lateral movement of the table longitudinally of the trailer, as well as prevent the leaf 104 from moving outwardly from the wall E when the leaf 105 is in the vertical position acting as a support for the leaf 104. This table can be folded into a very compact position and stored at the end of the stove between the stove and the extension J, when the extension J is in its operative position, as will be seen in Fig. 3. For convenience we have indicated the table as a whole by the reference character K.

The windows preferably are pivoted at their upper ends and the lower ends thereof locked in closed position by means of the fasteners 108, or in any other suitable manner. In order to prevent the drawers 61 and 62 from moving relative to each other we provide a turn-button 109 illustrated in Fig. 6 and in order to prevent the drawers from sliding we may provide each of the drawers with a fastener 110 of any desired construction. To the forward end of the frame we secure angle pieces 111 and 112 arranged on opposite sides of the channel sections 14 and secured thereto in any desired manner. The angle pieces are secured to each other by means of the rivets 113, and the angle pieces 111 and have a strap 114 secured thereto. This strap forms a loop at one end which loop embraces the pivot bolt 115 which secures the trailer to the automobile. The automobile body 116 carries a bracket 117 secured thereto to the rear thereof, and this has a spherical seat 118 best illustrated in Figs. 2, 14 and 15. The bracket also has an opening through which the bolt 115 extends. To the strap 114 on the underside thereof, there is secured a member 119 having a spherical outer surface which engages the spherical seat 118 and permits the connecting draw bar L formed by the angle pieces 112 and 111 to have a substantially universal connection with the bracket 117 so that as the automobile is drawn along the road, the trailer may turn to follow the automobile without having the wheels thereof slide, and also permits tilting of the trailer in any direction to compensate for irregularities in the road. A spring 120 surrounds the bolt 115 and holds the spherical member 119 in firm engagement with the spherical seat 118.

It is quite obvious that with the construction we have disclosed that the accessories for the trailer may be quickly detached and stored while the walls and top thereof may be also detached from one another and stored away in a relatively narrow space. For instance, the walls of the trailer may be stored at the sides and ends of the garage and the bottom may be telescoped with the top and slung from the rafters of the garage or tilted on edge and stored at one side thereof while the wheels may be taken from the axle and conveniently stored where desired.

The trailer in use provides a convenient amount of space for working room and also a convenient amount of space for a bedroom or sleeping quarters, there being a double use of a portion of the working space for sleeping quarters when that portion of the working space is not being used. A comparatively large amount of storage space is provided for food and clothing.

As will be seen from an inspection of Fig. 2 and Fig. 5 especially, the drawers 60 and 61 may be pulled out over the seat 67, and when pulled out have their upper surfaces in the same plane as the under side of the platform 59 which forms a support for the mattress 71. The top edges of the drawers are therefore in the same plane as the under side of the extension J when in an extended position such as shown in Fig. 2, the bottom edges of the drawers resting on the seat 67. This braces the section J and prevents it from moving about the axis of the hinges 70 in a clockwise direction as viewed in Fig. 2. It also takes a material amount of weight off the hinges 70 and can, if desired, be used to take substantially all of the weight of the section J and elements supported thereby. While the seat 67 braces the drawers, the same is not necessary to the functioning of the drawers as supports for the extension J for the drawers are positively guided by a platform 69 and flooring 17 and will not be deflected out of the ordinary guided path to materially affect the operation of the drawers as a support for the extension J.

The word "bottom" as used in the claims hereunto annexed, is intended to refer to the lower side of the trailer which is formed by the floor B and the floor G, the whole constituting the bottom floor of the working space and the sleeping compartment of the trailer.

Having thus fully described our invention, what we claim as new and desire to obtain by Letters Patent is:

1. In a trailer, the combination with a pair of wheels, of a frame having a portion arranged between said wheels and supported thereby, said frame having a second portion arranged forwardly of said wheels and below that portion of the frame arranged between said wheels, flooring covering the entire frame, a portion of said flooring being arranged over said wheels and a substantial distance above the axes of rotation thereof to provide a storage space between said wheels extending across a vertical plane through the axes of rotation of said wheels and below said flooring accessible from within said trailer, a closed body supported by said frame, walls forming a storage compartment in said storage space, said compartment being accessible from within said body.

2. In a trailer, the combination with a raised platform above the normal floor space within said trailer adapted to form a portion of a support for bedding, an extension for said platform movable into a position substantially in the same plane as said platform, and a drawer normally received substantially wholly within the space beneath said platform but movable outwardly to a position beneath said extension, means for guiding said drawer to and from said last position and for holding said drawer against movement when pressure is exerted on said extension toward said drawer whereby said guides hold said drawer in a fixed position so that they form a support for said extension.

3. In a vehicle of the class described, the combination with a floor space, of a raised platform for bedding having an extension in the same plane as said platform when in operative use, and an inoperative position to which the same may be moved manually, and means for supporting said extension comprising a drawer slidably mounted and positively guided for movement to and from a position beneath said extension, said extension resting on said drawer which due to its positive guiding is held against movement in the direction in which pressure is exerted on said extension.

4. In a vehicle of the class described, the combination with a body having a floor space for the occupants thereof, a raised platform to one side of said floor space, a storage space beneath said platform, a drawer positively guided into and out of said storage space, an extension for said platform movable to and from a position extending over said floor space to position the lower side thereof in substantially the same plane as the upper edges of said drawer when moved out from beneath said platform, said drawer when moved out from said storage space having the upper edges thereof engaging the under side of said extension to form a support therefor.

5. In a vehicle of the class described, the combination with an enclosed body portion having a floor, of a raised platform a substantial distance above the level of said floor to one side thereof to receive bedding, a drawer slidable to either a position beneath said platform or partially extended over said floor, guides for positively guiding said drawer in its movement to either of said positions, an extension for said platform movable to a position over said floor in substantially the plane of said platform and to a position to one side of said floor so as not to obstruct the use of the floor by a person occupying the vehicle, the under side of said extension being substantially in the same plane as the upper side of said drawer when extended, and a seat movable to and from an operative position over said floor and substantially in alignment with a plane through the under side of said drawer, whereby when said seat is in operative position, the same acts as a support for said drawer when said drawer is in position to support said extension.

6. In a vehicle, the combination with a closed body having a floor used as a working space for occupant of said vehicle, a seat at one side of said floor, a platform at a higher elevation than said seat for supporting bedding and being arranged to the rear of said seat and to one side of said floor, a drawer movable from a position substantially entirely beneath said platform to a position over said seat with the under side of said drawer engaging said seat, an extension for said platform movable to and from an operative position over said drawer when said drawer is in said last mentioned position with the under side of said extension engaging the upper side of said drawer and the upper side of said extension substantially in the plane of the upper side of said platform, whereby said seat acts as a support for said drawer and said drawer acts as a support for said extension.

7. A device as set forth in claim 6 in which said extension is provided with legs for supporting the free end thereof remote from said platform.

8. In a trailer, the combination with a body having a floor portion at one end thereof and a raised bedding supporting portion to one side of said floor portion, a seat of lesser elevation above said floor portion than said bedding supporting portion and adjacent said bedding supporting portion, and an extension for said bedding supporting portion movable to an operative position in substantially the same plane as said bedding supporting portion and entirely over said seat portion, whereby said seat portion does not obstruct the remaining floor portion adjacent said bedding supporting portion and extension, said extension being movable to an inoperative position substantially entirely clear of the space directly above said seat portion in order that said seat may be used without interference by said extension.

9. A device as set forth in claim 8 in which said floor portion extends substantially the full width of said trailer and in which said bedding supporting portion is arranged the full width of said trailer, and said bedding supporting portion and floor supporting portion are arranged in tandem relation with respect to each other in the direction in which said trailer moves and in which said seat portion extends substantially across the entire width of said trailer from one side thereof to the other.

10. A device as set forth in claim 8 in which there are a plurality of drawers beneath said bedding supporting portion which have the upper edges thereof in substantially the same plane as the under side of said extension when in operative position and the lower edges thereof substantially in the plane of the upper side of said seat, and being movable from a position substantially entirely beneath said bedding supporting portion in which position they do not obstruct said seat portion, to a position over said seat and beneath said extension.

11. A device as set forth in claim 6 in which said drawer when in an inoperative position forms a back for said seat.

JAMES W. SMALL.
ELMER W. PAHLKE.